United States Patent
Christenson (10) Patent No.: US 11,521,774 B2
(45) Date of Patent: Dec. 6, 2022

(54) MAGNET CONTROL UNITS

(71) Applicant: Hubbell Incorported, Shelton, CT (US)

(72) Inventor: Eric Scott Christenson, High Point, NC (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 17/458,832

(22) Filed: Aug. 27, 2021

(65) Prior Publication Data
US 2022/0068535 A1     Mar. 3, 2022

Related U.S. Application Data

(60) Provisional application No. 63/071,798, filed on Aug. 28, 2020.

(51) Int. Cl.
| H01F 7/18 | (2006.01) |
| H02H 9/04 | (2006.01) |
| H01F 7/20 | (2006.01) |

(52) U.S. Cl.
CPC ............. *H01F 7/18* (2013.01); *H02H 9/047* (2013.01); *H01F 7/206* (2013.01)

(58) Field of Classification Search
CPC ............ H01F 7/064; H01F 7/18; H01F 7/206; H02H 9/047; H01H 47/325
USPC ........................................................ 361/152
See application file for complete search history.

(56) References Cited

U.S. PATENT DOCUMENTS

| 1,517,276 | A | 12/1924 | Brooke |
| 3,629,663 | A | 12/1971 | Butkus |
| 3,783,344 | A | 1/1974 | Ono |
| 4,032,828 | A | 6/1977 | Strobl |
| 4,167,030 | A | 9/1979 | Heidt |
| 4,208,656 | A | 6/1980 | Littiwin |
| 4,210,994 | A | 7/1980 | Schwartz |
| 4,350,379 | A | 9/1982 | Peroutky |
| 4,414,522 | A | 11/1983 | Rybak |
| 4,600,964 | A | 7/1986 | Ela |
| 4,633,147 | A | 12/1986 | Posma |

(Continued)

FOREIGN PATENT DOCUMENTS

| DE | 3228178 | 2/1984 | | |
| DE | 3228178 A | * 2/1984 | ............... | B66C 1/06 |

(Continued)

OTHER PUBLICATIONS

Hubbell_ICD_OptimizerM350GENII_Catalog_2012 (1 page).
Hubbell_ICD_OptimizerM150GENII4291_Catalog_2012 (1 page).

*Primary Examiner* — Kevin J Comber
(74) *Attorney, Agent, or Firm* — Wissing Miller LLP (57) ABSTRACT

A solid-state magnet control unit includes a housing and magnet controller circuitry mounted within the housing. The magnet controller circuitry controls current passing through a magnet. The magnet controller circuitry includes a power storage unit, drivers in a bridge network, e.g., an insulated gate bipolar transistor (IGBT) in a bridge network, and dump circuitry. The dump circuitry limits circuit damage to the magnet controller circuitry and other components contained within the magnet control unit. When the dump driver is not operational, operation of the magnet control unit is automatically switched to first or second safety mode of operation.

18 Claims, 10 Drawing Sheets

(56) References Cited

U.S. PATENT DOCUMENTS

| | | | |
|---|---|---|---|
| 4,639,647 A | 1/1987 | Posma | |
| 4,965,695 A | 10/1990 | Baumann | |
| 5,166,654 A | 11/1992 | Doyelle | |
| 5,325,260 A | 6/1994 | Repetto | |
| 5,332,987 A | 7/1994 | Hennessy | |
| 5,347,169 A | 9/1994 | Preslar | |
| 5,382,935 A | 1/1995 | Doyelle | |
| 5,748,062 A | 5/1998 | Kirkpatrick | |
| 5,813,712 A | 9/1998 | Mozelt | |
| 5,998,944 A | 12/1999 | Clutter | |
| 6,076,873 A | 6/2000 | Jung | |
| 6,157,148 A | 12/2000 | Posma | |
| 6,170,923 B1 | 1/2001 | Iguchi | |
| 6,710,574 B2 | 3/2004 | Davis | |
| 6,767,177 B2 | 7/2004 | Opitz | |
| 6,784,721 B2 | 8/2004 | Torrisi | |
| 6,992,520 B1 | 1/2006 | Herbert | |
| 7,245,471 B2 | 7/2007 | Pollock | |
| 7,495,879 B2 | 2/2009 | Thexton | |
| 7,697,253 B1 | 4/2010 | Maraval | |
| 9,985,426 B2 * | 5/2018 | Jonas | G01R 33/3815 |
| 2003/0194305 A1 | 10/2003 | Opitz | |
| 2004/0236183 A1 | 11/2004 | Durell | |
| 2006/0176635 A1 * | 8/2006 | Thexton | H01F 7/18 361/100 |

FOREIGN PATENT DOCUMENTS

| | | | | |
|---|---|---|---|---|
| DE | 3239153 | | 4/1984 | |
| DE | 3239153 A | * | 4/1984 | H01F 7/1615 |
| JP | 54157961 | | 12/1972 | |
| JP | 05343222 | | 12/1993 | |
| JP | 05343222 A | * | 12/1993 | F02D 19/022 |
| WO | WO-2015008486 A1 | * | 1/2015 | D06F 23/02 |

* cited by examiner

MAGNET CONTROL UNITS

CROSS REFERENCE TO RELATED APPLICATIONS

The present disclosure is based on and claims benefit from U.S. Provisional Patent Application Ser. No. 63/071,798 filed on Aug. 28, 2021, entitled "Magnet Control Units" the contents of which are incorporated herein in their entirety by reference.

BACKGROUND

Field

The present disclosure generally relates to controllers for electromagnets, and more particularly to solid state controllers for electromagnets used with industrial machinery.

Description of the Related Art

Electromagnets for use with lifts, hoists, crane and any other industrial machinery, such as processing machines, pick-and-place machines, and automation machines, are well known and are used for positioning and handling ferromagnetic materials in a variety of ways. Such electromagnets can be used in the lifting of flat, round, and/or other shapes of ferromagnetic materials. Controllers for such electromagnets typically use a voltage dump circuit to absorb regeneration current from the magnet in the event the power supply, frequently a dedicated standalone rectifier, cannot accept the current. A voltage dump is also known as a brake chopper or a regeneration absorber.

SUMMARY

Solid-state magnet control units that use a solid state bridge network to control the operation of electromagnets are described in commonly owned U.S. Pat. No. 7,495,879, which is incorporated herein in its entirety by reference. The present disclosure provides exemplary embodiments of improvements to the solid-state magnet control units and circuits. In one exemplary embodiment the magnet control unit makes frequent DC bus voltage measurements through a processor and software and shorts the magnet terminals if the bus voltage rises above a pre-defined limit. In another exemplary embodiment, the magnet control responds to the bus voltage exceeding a second, higher limit during regeneration by driving the magnet temporarily. This driving of the magnet during regeneration draws down the DC bus voltage. A magnet control unit for controlling an electromagnet may include a housing, a processor within the housing and a drive unit within the housing. The drive unit includes a bridge network operatively connected to the processor and a dump network having at least a portion operatively connected to the processor. The bridge network is operatively connected to the electromagnet and has a plurality of drivers arrange in a bridge configuration. In the event the dump network is determined by the processor not to be functioning, the processor automatically configures the bridge network to a safety mode of operation which diverts regeneration current from the magnet through the terminals.

An example of a magnet controller according to the present disclosure used to control an electromagnet includes a processor and a drive unit. The drive unit includes a bridge network operatively connected to the processor and a dump network having at least a portion operatively connected to the processor. The bridge network is operatively connected to the electromagnet and has a plurality of drivers arrange in a bridge configuration. In the event the dump network is determined by the processor not to be functioning, the processor automatically configures the bridge network to a safety mode of operation where the magnet terminals are effectively shorted together.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
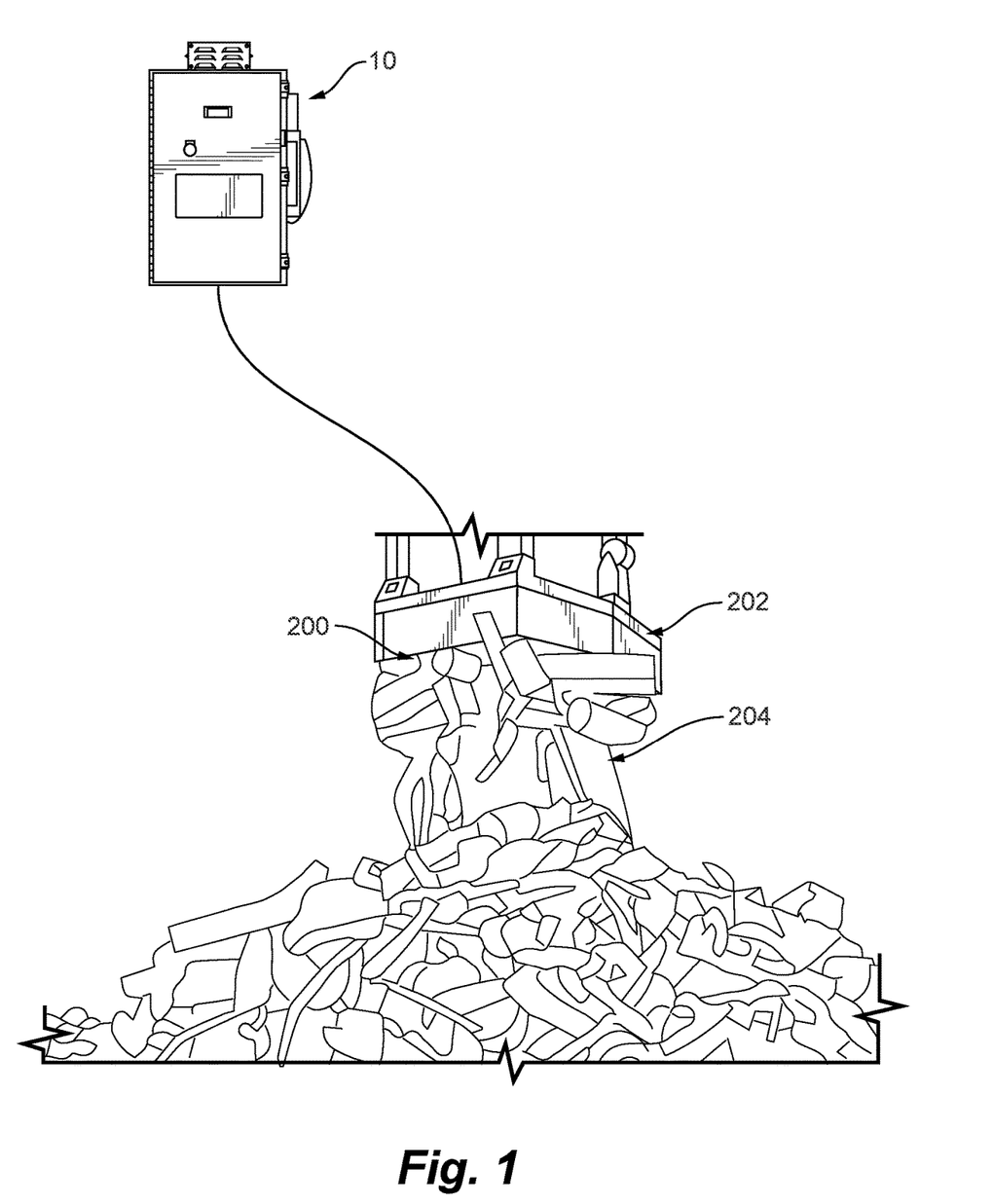
FIG. 1 is an exemplary system diagram for using the magnet control units according to the present disclosure, illustrating a magnet control unit operatively connected to an electromagnet attached to a pick-and-place machine.
Figure 2:
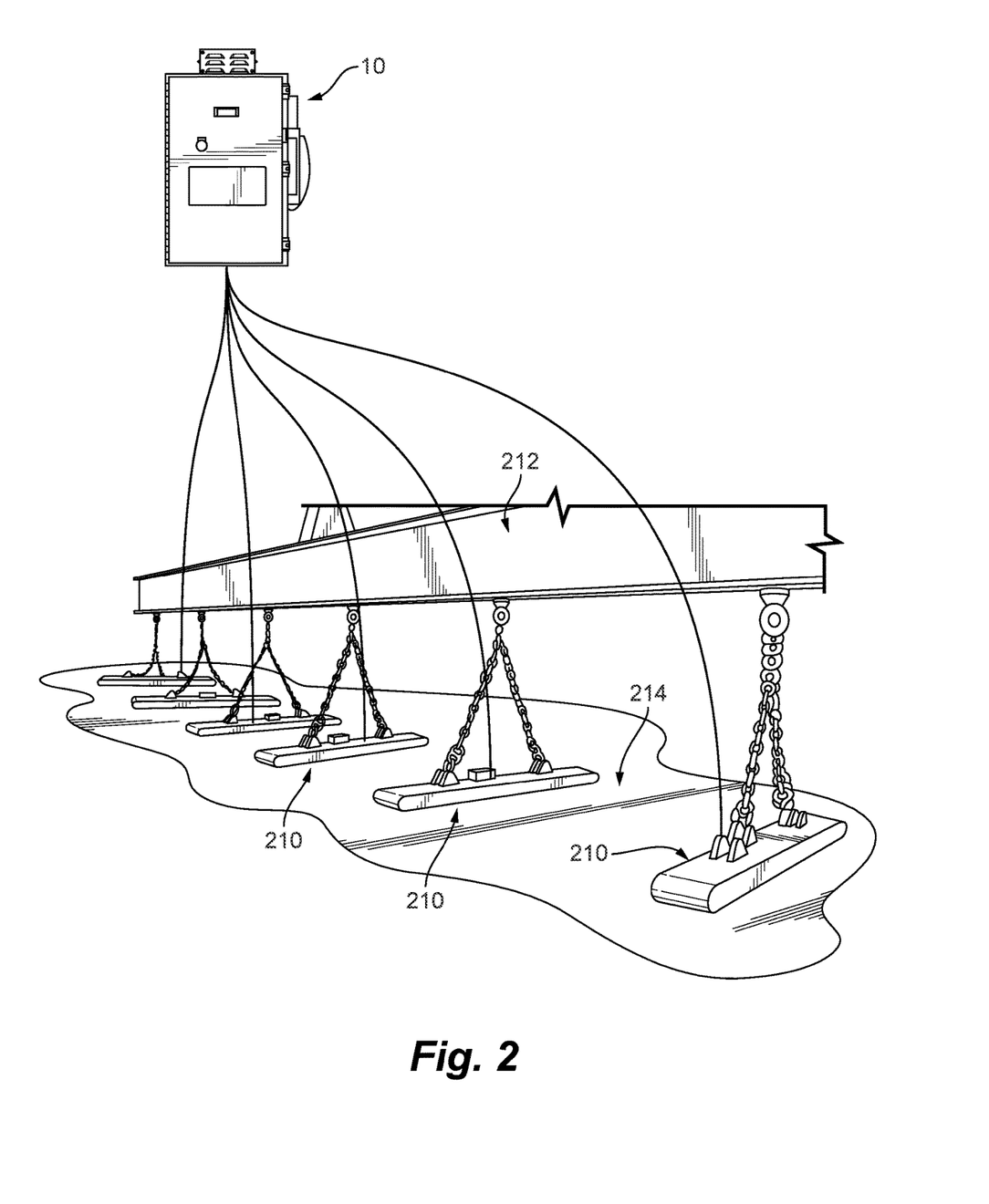
FIG. 2 is another exemplary system diagram for using the magnet control units according to the present disclosure, illustrating a magnet control unit operatively connected to a plurality of electromagnets attached to a crane.

The present disclosure provides exemplary embodiments of magnet control units and magnet controller circuitry used to control the operation of one or more electromagnets that are typically part of industrial machinery used in, for example, steel, scrap, slag, railroad, shipbuilding and mining magnet applications. As shown in FIG. 1, a magnet control unit 10 can be operatively, e.g., electrically, connected to and used to control the operation of a single electromagnet 200. In this exemplary application, the electromagnet 200 is part of a pick-and-place machine 202 that lifts ferromagnetic materials 204, such as scrap metal, and places such ferromagnetic materials 204 in a new location. As shown in FIG. 2, a magnet control unit 10 can be operatively, e.g., electrically, connected to and used to control the operation of multiple electromagnets 210 either separately or collectively. In this exemplary application, the multiple electromagnets 210 are part of a crane 212 that lifts ferromagnetic materials 214, such as sheet metal, and places such ferromagnetic materials 214 in a new location. For ease of description, the electromagnets 200 or 210 may also be referred to herein as the "magnets" in the plural and the "magnet" in the singular. Further, the ferromagnetic materials 204 or 214 lifted by the magnets 200 or 210 may also be referred to herein as the "lift load."

Figure 3:
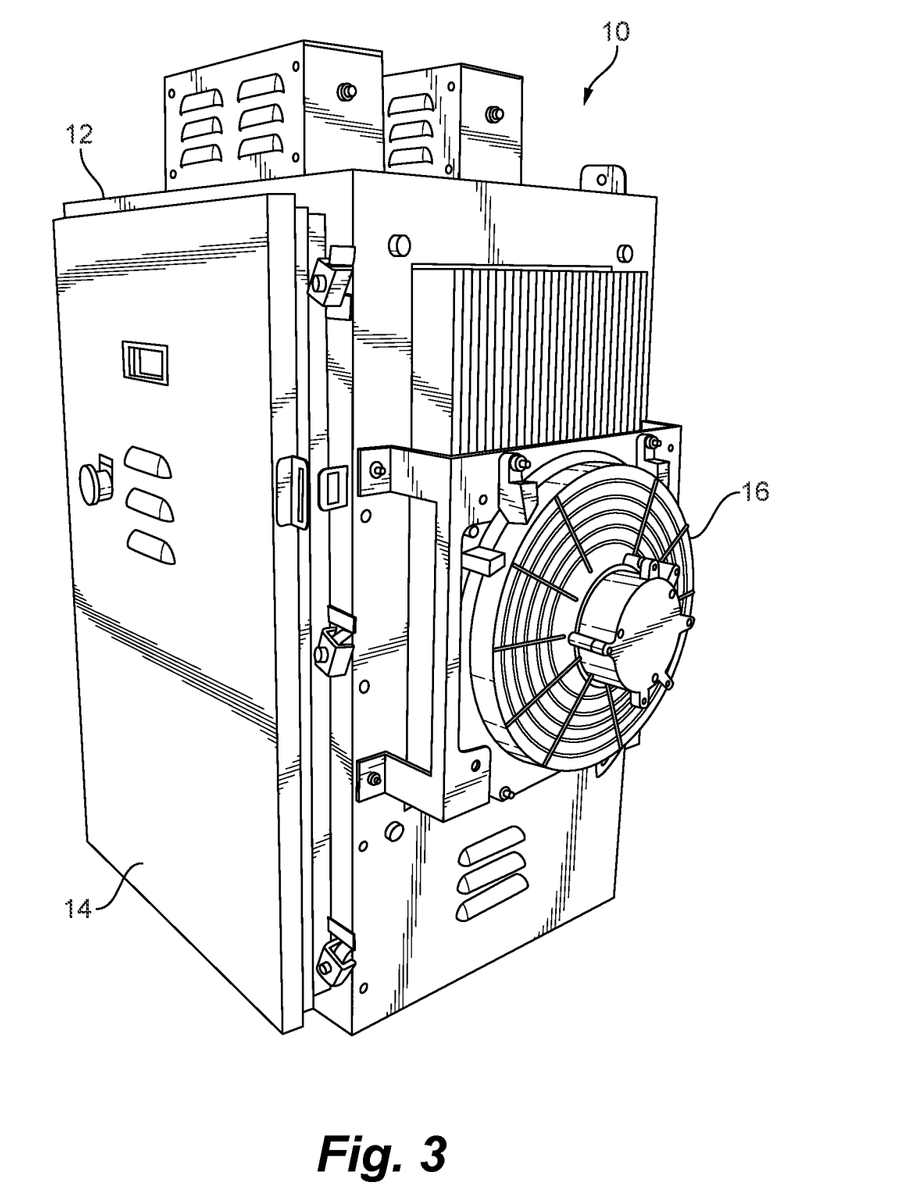
FIG. 3 is perspective view of an exemplary embodiment of a magnet control unit housing according to the present disclosure.
Figure 4:
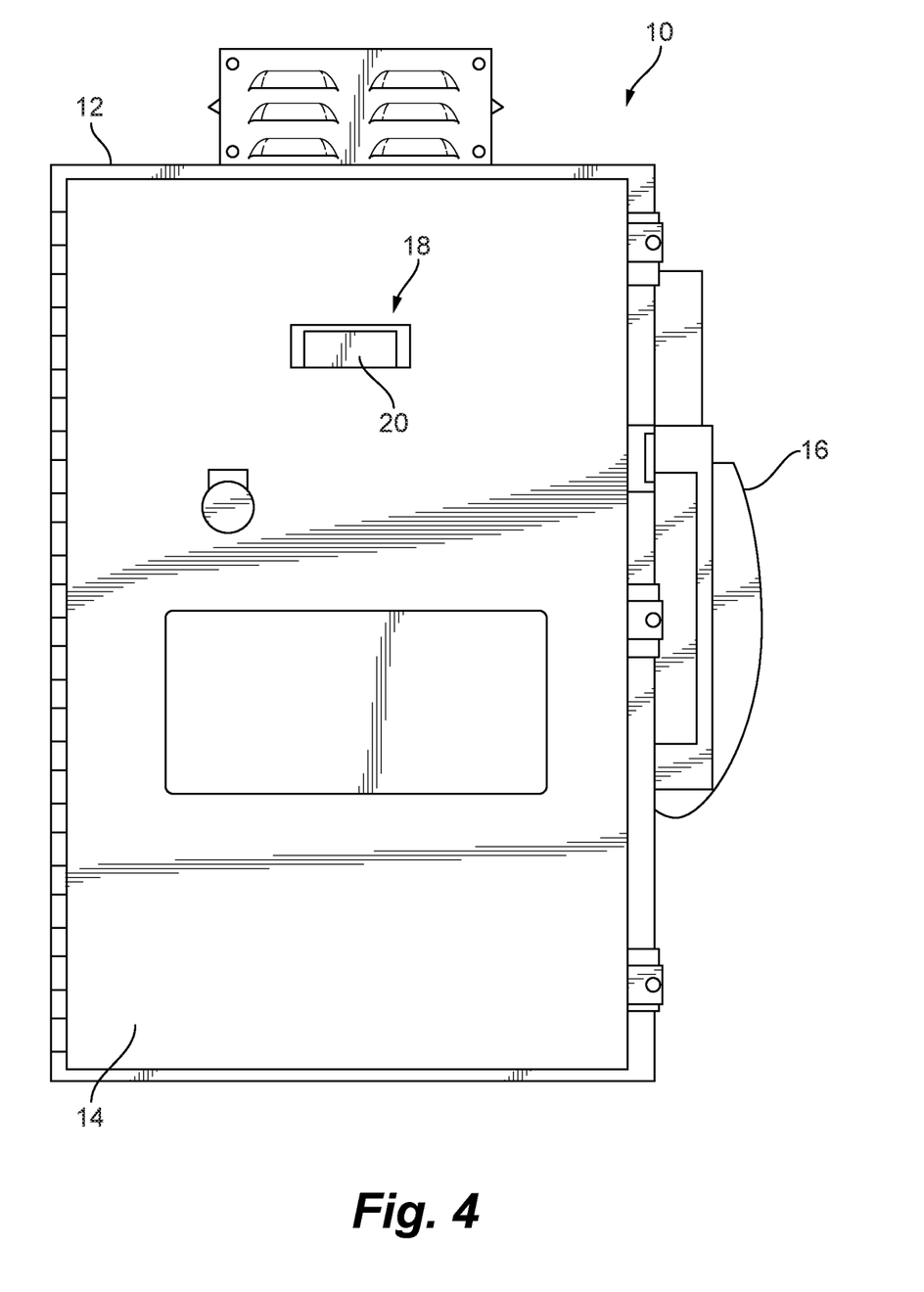
FIG. 4 is front elevation view of the magnet control unit housing of FIG. 3.
Figure 5:
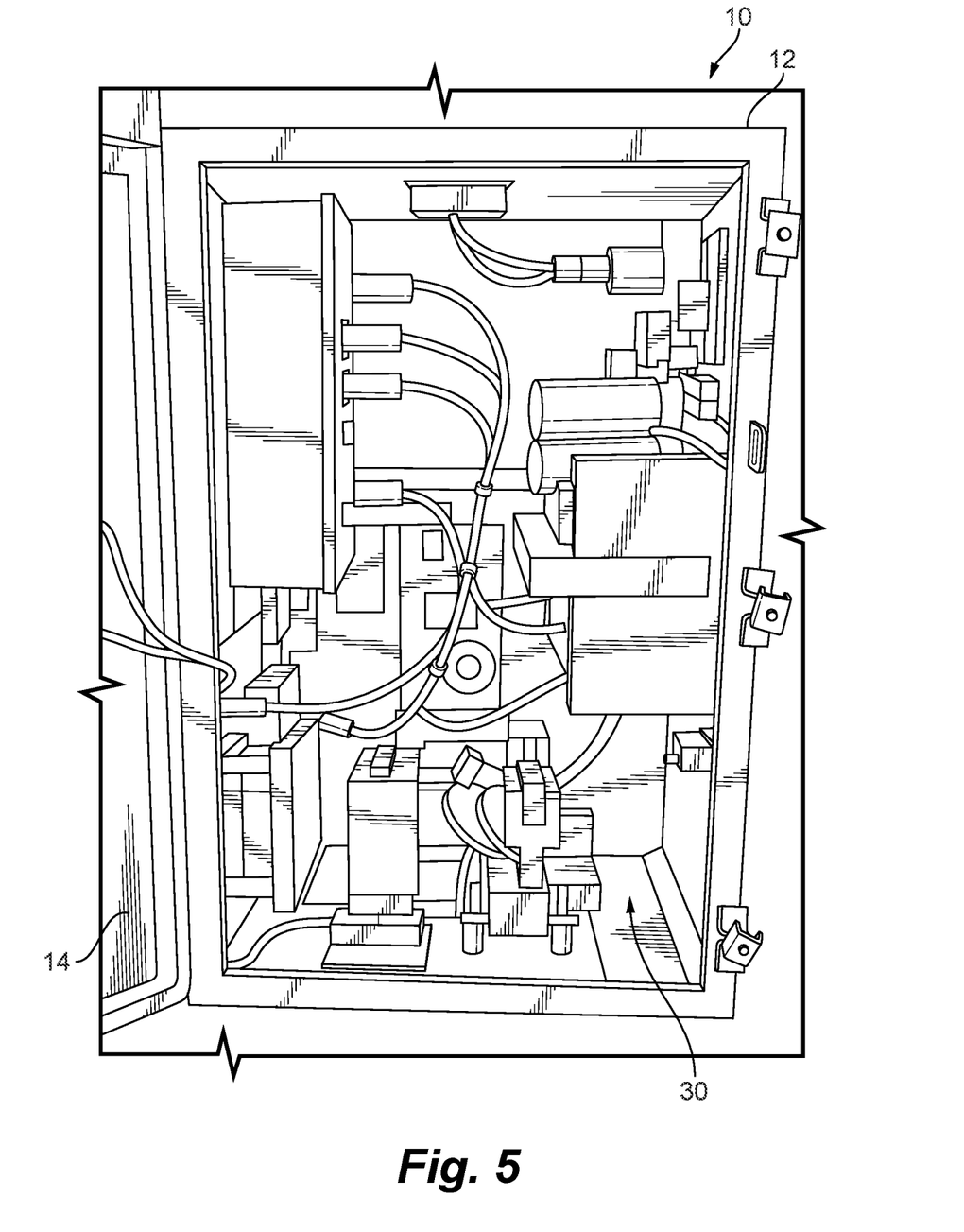
FIG. 5 is front elevation view of an interior of the magnet control unit housing of FIG. 4.

Referring now to FIGS. 3-5, an exemplary embodiment of a magnet control unit 10 according to the present disclosure is shown. In this exemplary embodiment, the magnet control unit 10 includes a housing 12 and magnet controller 30 within the housing 12. The housing 12 has a removable cover 14. The housing 12 can be mounted to the industrial machinery, e.g., a hoist or crane 212, associated with the magnet or magnets 210. One or more fans 16 are mounted to an exterior of the housing 12 and used to cool the electrical, electronic and other components within the housing 12. Terminals for electrically connecting the magnet control unit 10 to one or more magnets, e.g., magnet 200 or magnets 210, are also included in the housing 12. The magnet control unit 10 may also include a DC source of power, and/or can be configured to connect to an external DC power supply or source. As shown in FIG. 4, a display device 18 can be mounted to the housing cover 14 to provide information to users regarding the operation of the magnet control unit 10 via a display screen 20. Such information can be presented in the form of alphanumeric characters, icons, images, etc. The display device 18 can be configured as a light emitting diode (LED) display device, an LCD display device or other known display device.

Figure 6:
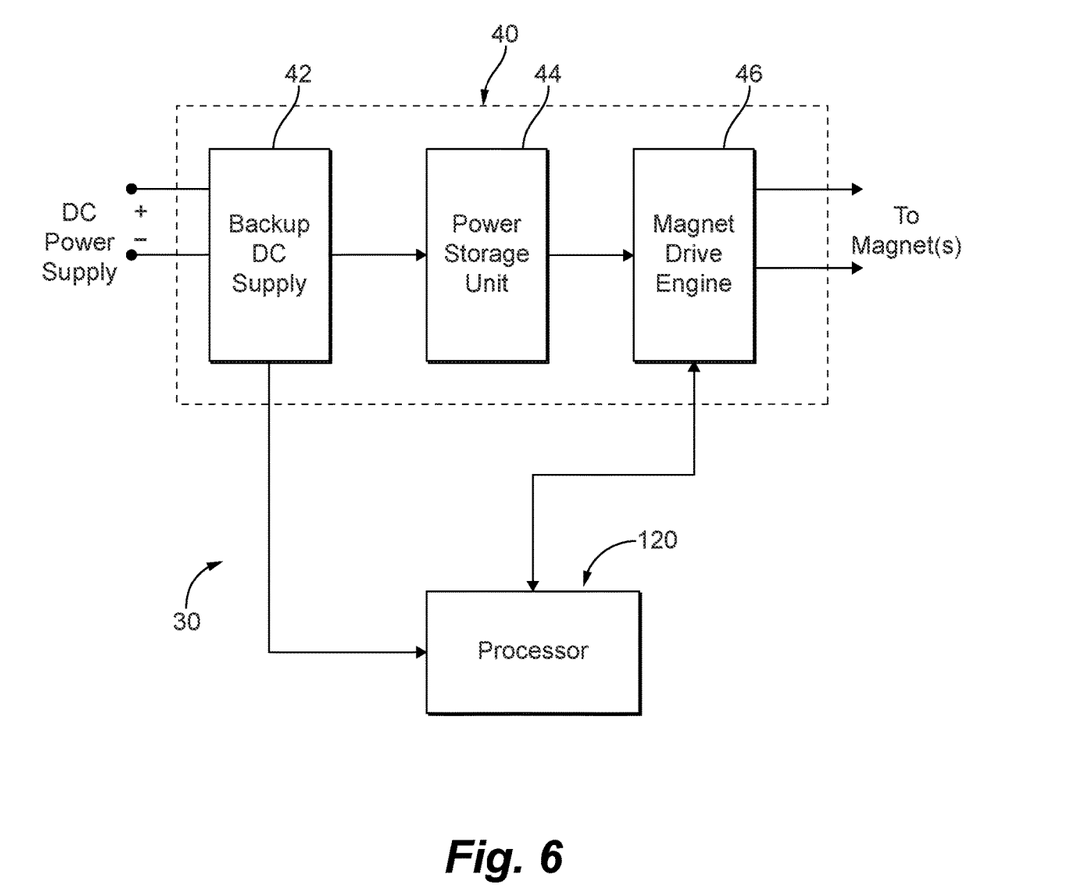
FIG. 6 is a block diagram of an exemplary embodiment of magnet controller circuitry within the magnet control unit of FIG. 3, illustrating a drive unit and a processor.
Figure 7:
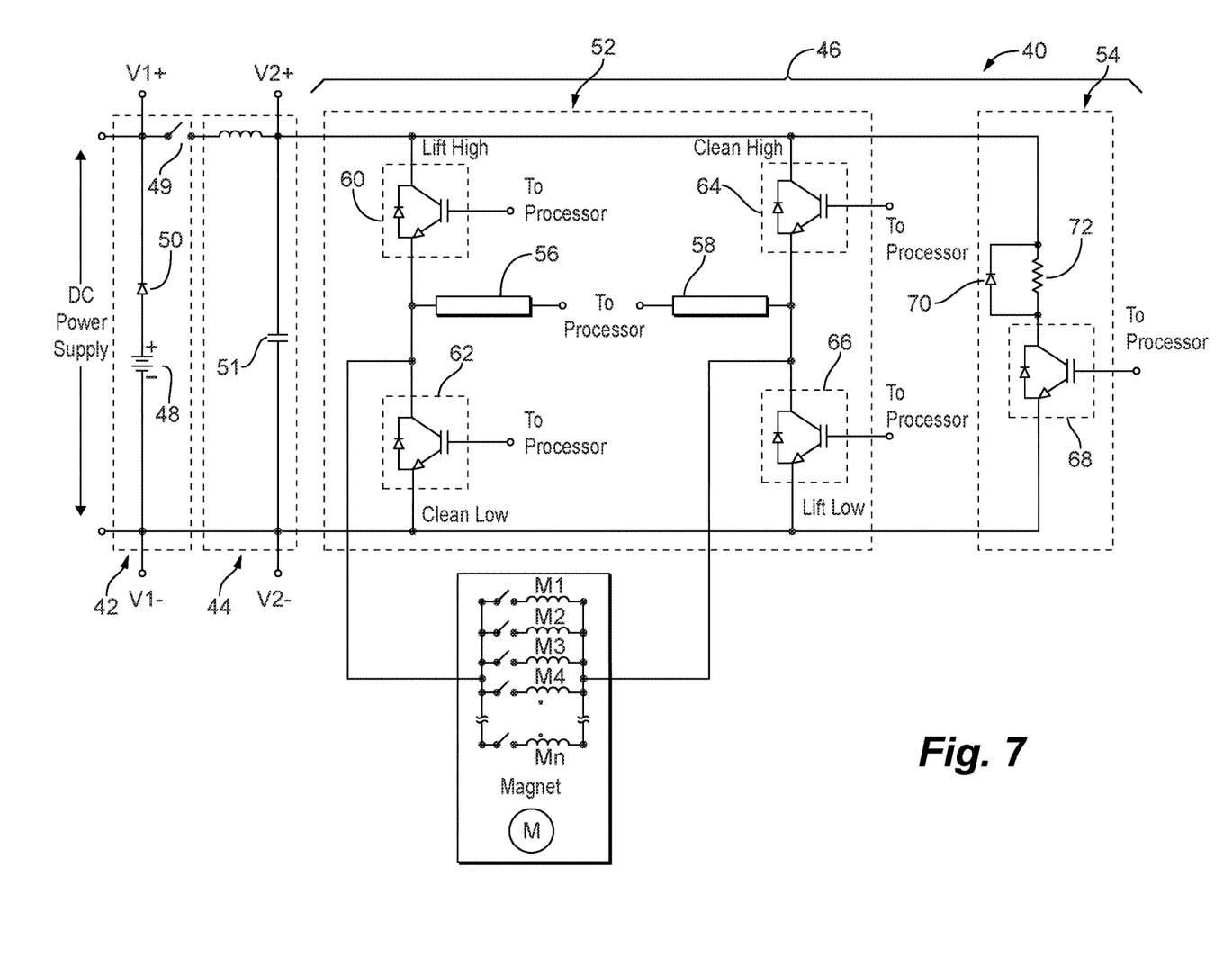
FIG. 7 is a schematic diagram of an exemplary embodiment of the drive unit of FIG. 6.
Figure 8:
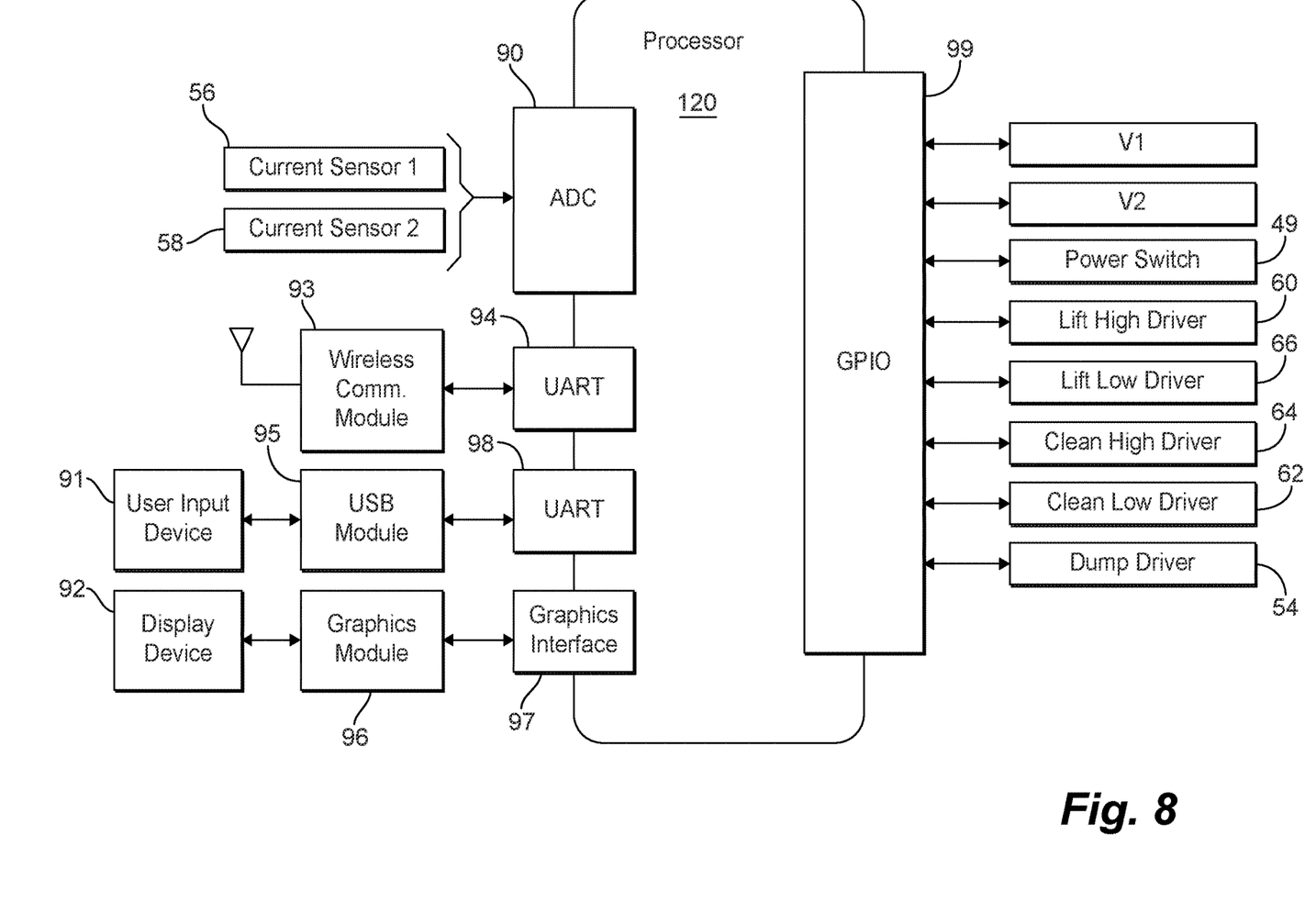
FIG. 8 is a block diagram of an exemplary embodiment of a processor for controlling the operation of the magnet controller circuitry of FIG. 6.

Referring now to FIGS. 6-8, as noted above the magnet controller 30 is mounted in the housing 10. The magnet controller 30 includes drive unit 40 and a processor 120. The drive unit 40 is electrically connected to one or more electromagnets M, e.g., magnets M1, M2, M3, M4, Mn, connected in parallel using, for example, relay inputs or the like, as is known. In the exemplary embodiment of FIG. 6, the drive unit 40 includes a backup power supply 42, a power storage unit 44 and a magnet drive engine 46. In this exemplary embodiment, the backup power supply 42 is built into the housing 12 and includes a battery bank 48, one or more isolation diodes 50 and a power switch 49, seen in FIG. 7. The battery bank 48 may be provided as a source of backup power to the magnet controller 30 in the event there is an extended loss of the DC power supply voltage V1. The battery bank 48 may be one or more batteries connected in a series and/or parallel combination in order to output the DC supply voltage V1 and current capacity for a desired application. As a non-limiting example, for an application similar to that shown FIG. 1 where the magnet M is a single magnet 200 operatively connected to a pick-and-place hoist 202, the DC supply voltage V1 may be in a range of about 230 VDC and about 270 VDC, and the desired current capacity may be in a range of about 50 amps and about 300 amps. As another non-limiting example, for an application similar to that shown in FIG. 2 where the magnet M includes multiple magnets 210 operatively connected to a crane 212, the DC supply voltage V1 may be in a range of about 230 VDC and about 270 VDC, and the desired current capacity may be in a range of about 20 amps and about 100 amps. The one or more isolation diodes 50 are provided to prevent the battery bank 48 from charging over the DC supply voltage V1.

Continuing to refer to FIGS. 6 and 7, the power storage unit 44 supplies DC power to the magnet control unit 10, including the magnet controller 30. In the exemplary embodiment of FIG. 7, the power storage unit 44 is a capacitor bank that includes one or more capacitors arranged in parallel and/or series. The characteristics of the capacitors 51 in the capacitor bank are dependent upon a number of factors, including ripple current capacity. A non-limiting example of suitable capacitors for use in the capacitor bank includes electrolytic capacitors, such as an electrolytic capacitor rated for operating in the range of about 400 VDC and about 500 VDC with a capacitance of between about 500 microfarads and about 50,000 uF.

It is noted that under normal operating conditions, the DC supply voltage V1 is equal to the output voltage V2 at the power storage unit 44, and is above the output voltage of the battery bank 48 such that the one or more isolation diodes 50 are reversed biased and the battery bank 48 is in a static condition. If the DC supply voltage V1 is lost so that the DC supply voltage V1 falls below the output voltage of the battery bank 48, the one or more isolation diodes 50 become forward biased so that current flows from the battery bank 48 to the magnet drive engine 46 and processor 120 so that the magnet M remains energized. With the magnet M energized, the magnet is able to hold the lift load. When the DC supply voltage V1 returns, the one or more isolation diodes 50 are again reverse biased so that power for the magnet drive engine 46 and processor 120 is again supplied from the DC power supply, and the drive unit 40 returns to normal operation. It is noted that, the battery bank 48 is normally charged using a charging circuit connected across the battery bank as is known.

Continuing to refer to FIG. 7, the magnet drive engine 46 includes a bridge network 52 and a dump network 54. The bridge network 52 is provided to control the magnets M by controlling the direction of current flow to the magnets M. The bridge network 52 includes a lift high driver 60, a clean low driver 62, a clean high driver 64 and a lift low driver 66. The dump network 54 is electrically connected in parallel to the bridge network 54. The dump network 54 is provided to maintain the output voltage V2 at the power storage unit 44 at a predefined voltage, described in more detail below. The dump network 54 includes a dump driver 68, a discharge diode 70 and a discharge resistor 72. It is noted that dump networks are also referred to in industry as brake choppers or regeneration absorbers.

A first current sensor 56 and the second current sensor 58 are provided to measure the current flowing through the one or more magnets M. The current sensors 56 and 58 are connected to the processor 120 via an analog to digital converter 90, as shown in FIG. 8. The processor 120 can monitor the current flowing through the one or more magnets during the different modes of operation of the one or more magnets 210, e.g., a lift mode, a drop mode, a clean mode and a safety mode. A non-limiting example of the first current sensor 56 and the second current sensor 58 is a Hall effect current transformer.

Continuing to refer to FIG. 7, the lift high driver 60, clean low driver 62, clean high driver 64 and the lift low driver 66 are configured in as a bridge network 52. The lift high driver 60 and the lift low driver 66 are operatively controlled by the processor 120 to perform a lift operation. The clean low driver 62 and clean high driver 64 are operatively controlled by the processor 120 to perform a clean operation. The dump driver 68 is operatively controlled by the processor 120 and is provided to protect the magnet controller 30 by limiting the voltage to the power storage unit 44 and the bridge network 52. In the exemplary embodiment shown in FIG. 7, the lift high driver 60, clean low driver 62, clean high driver 64, lift low driver 66 and the dump driver 68 are insulated-gate bipolar transistors (IGBTs). For background, an IGBT is a cross between bipolar and metal oxide field effect transistors (MOSFETs). IGBTs have output switching and conduction characteristics of bipolar transistors but are voltage controlled like MOSFETs. IGBTs generally have the advantages of high current handling capabilities of bipolar transistors with the ease of control of MOSFETs. One drawback associated with the use of IGBTs in applications with electromagnets is that IGBTs are easily damaged by overvoltage and/or voltage transients caused, for example, by short circuits, cable breaks, and/or regeneration from the magnet when removing or reversing the current in the magnet to drop the load. The dump network 54 is configured to limit the voltages occurring across the $V2^+/V2^-$ DC Bus to a level that is less than the voltage rating of each driver 60, 62, 64 and 66, and the capacitor bank 51, so as to limit and possibly prevent damage to the magnet controller 30 that may be caused by overvoltage events and/or voltage transients. In an operational example, the voltage across the dump network 54 is configured to limit the voltages occurring across the capacitor bank 51, lift high driver 60, clean low driver 62, clean high driver 64 and the lift low driver 66. The use of the dump network 54 in combination with the bridge network 52 protects the magnet controller 30 due in large part to the speed in which the dump driver 68 can compensate for overvoltage events and/or voltage transients.

Referring again to FIGS. 6 and 8, the processor 120 is provided to control the operation of the drive unit 40 to monitor voltage levels, to monitor current levels and to control communications with the magnet control unit 10. The processor 120 may be, for example, any type of processor, such as a microprocessor, a micro-controller, application specific integrated circuit (ASIC), other processor or controller, or computer capable of controlling the operation of the magnet control unit 10. In the exemplary embodiment shown, the processor 120 is operatively coupled to and can receive input data from and/or can provide output data to the DC supply voltage V1, the power storage unit 44 voltage V2, the display 18, the power switch 49, operator inputs from a user input device 91, a display device 92, the first current sensor 56, the second current sensor 58, the lift high driver 60, clean low driver 62, clean high driver 64, the lift low driver 66, and the dump high driver 68.

The magnet control unit 10 can be configured to perform lift and drop operations in response to input commands or information from, for example, a user input device 91 or a computer network interface. It is noted that the user input device may be directly connected to the processor 120 or wirelessly connected to the processor using wireless technology, i.e., a wireless communication module 93 such as Bluetooth technology. Communications module 93 is coupled to Universal Asynchronous Receiver (UART) 94. UART 94 is a physical circuit in a microcontroller or a standalone IC. UART 94 is used to transmit and receive serial data from communications module 93 and transmit the data to processor 120. User input device 91 is coupled to USB module 95 and receives and transmits serial data from device 91 to module 95. UART 98 receives and transmits serial data to processor 120. Display device 92 is coupled to graphics module 96 to receive and transmit graphic data to graphic interface 97. Interface 97 transmits information to processor 120. Examples of user input devices include keypads, computing devices and mobile computing devices. General Purpose Input/Output 99 (GPIO) is a standard interface used to connect processor to other electronic devices. For example, GPIO 99 is used to connect V1, V2, power switch 49, lift high driver 60, lift low driver 66, clean high driver 64, clean low driver 62 and dump driver 54 to processor 120. Generally, in response to receiving a lift command from the user input device 91, the magnet controller 30 applies a lifting current to the magnet M so that the magnet can lift a lift load. The lifting current is the current needed to be supplied to the magnet M so that the lift load is captured within the magnetic field of the magnet. The lifting current depends upon a number of factors including, for example, the composition of the lift load and the weight of the lift load. As a non-limiting example, for capturing scrap metal from a pile of scrap metal, the lifting current may be in the range of about 50 amps and about 200 amps. After a predetermined period of time from when the lifting current is applied to the magnet M, e.g., after about 5 seconds, the lifting current is automatically adjusted to a holding current level, which is typically less than the lifting current. For ease of description, the predetermined period of time from when the lifting current is applied to the magnet M may also be referred to herein as the "lift time." The holding current is the current needed to hold the lift load within the magnetic field of the magnet. The holding current depends upon a number of factors, including the composition of the lift load and the weight of the lift load. As a non-limiting example, for holding the scrap metal lifted from the pile of scrap metal, the holding current may be in the range of about 40 amps and about 160 amps.

When a lift command is received by the magnet controller 30, the configuration of the drivers 60, 62, 64 and 66 in the bridge network 52 is set by the processor 120 to apply the lifting current to the magnet M. More specifically, when a lift command is received by the magnet controller 30, the processor 120 turns the lift high driver 60 "on" and applies a pulse-width modulated (PWM) signal at a 100% duty cycle to the lift low driver 66 so that the lift low driver 66 is effectively turned "on". The processor 120 turns both the clean low driver 62 and the clean high driver 64 "off" After the lift time has expired, the processor 120 reduces the current to the magnet M to the holding current level. In the exemplary embodiment shown, the processor 120 reduces the current to the magnet by adjusting the duty cycle of the PWM signal applied to the lift low driver 66 so that the lift low driver 66 is turned "on" for only part of its duty cycle. As a non-limiting example, the duty cycle may be at a frequency range of about 100 Hz and about 10 KHz. For the holding current level, the duty cycle of the PWM signal applied to the lift low driver 66 may be in the range of about 60% and about 80%. In the lift mode of operation, the current flows from the DC power supply in a lift direction, i.e., through the lift high driver 60, through the magnet M and through the lift low driver 66 so that the magnetic field generated by the magnet M is an attractive force. It is noted, that when the lift low driver 66 is "on", the current flowing through the magnet is drawn from the DC power supply, and when the lift low driver 66 is "off", the current flowing through the magnet M is flywheeling as is known, and no current is being drawn from the DC power supply.

Figure 9:
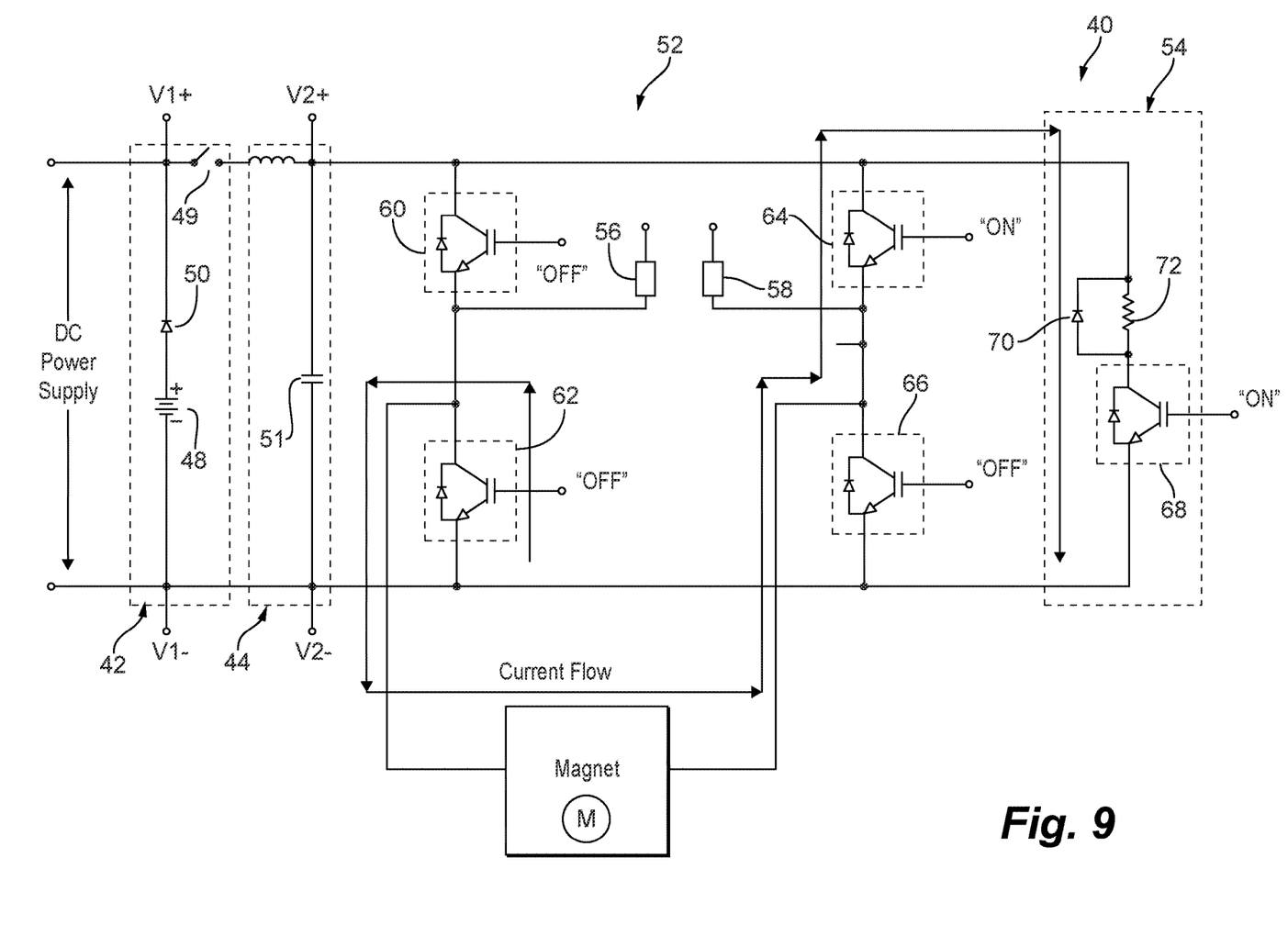
FIG. 9 is a schematic diagram of an exemplary embodiment of the drive unit of FIG. 6, illustrating the flow of current through the drive unit when the magnet control unit is in a regenerating mode of operation and a dump driver is turned "on"

Generally, in response to receiving a drop command from a user input device 91, the magnet controller 30 rapidly discharges the magnet so that the lift load is released from the magnet M. The processor 120 also monitors the current flowing through the magnet using the current sensors 56 and 58. In the exemplary embodiment shown, the magnet controller 30 rapidly discharges the magnet by rapidly reducing the current flowing through the magnet M. More specifically, when a drop command is received by the magnet controller 30, the processor 120 turns both the lift high driver 60 and the lift low driver 66 "off," and turns the clean low driver 62 and the clean high driver 64 "on". The magnet current then flows from the magnet M through the clean high driver 64 into the positive side of the power storage unit 44, and current returns from the magnet M through the clean low driver 62 to the negative side of the DC supply voltage. With the current flowing or regenerating from the magnet M through the clean high driver 64 into the power storage unit 44, the voltage V2 of the power storage unit 44 rises to a level that may be greater than the voltage V1 supplied by the DC power supply. When the processor 120 determines that the voltage V2 across the power storage unit 44 rises to a predefined voltage level, e.g., 325 VDC, the processor 120 turns the dump driver 68 "on" so that current now flows from the magnet M through the dump network 54 to the negative side of the DC power supply voltage V1, as seen in FIG. 9. As a result, the voltage V2 of the power storage unit 44 is rapidly reduced by the resistor 72 in the dump network 54. When the voltage V2 drops to a predefined level, e.g., 320 VDC, the processor 120 turns the dump driver 68 "off" causing the voltage V2 to again rise. By turning the dump driver 68 "on" and "off" as described, the dump network 54 maintains the voltage V2 across the power storage unit 44 at or below the predefined voltage level while the regeneration current through the magnet dissipates. Thus, the dump network 54 rapidly reduces the energy in the magnet M while maintaining a controlled voltage V2 at the power storage unit 44. After the processor 120 configures the bridge network 52 to rapidly reduce the current flowing through the magnet M, and the current flowing through the magnet falls below a predefined current level, e.g., 5 amps, the processor 120 then automatically configures the bridge network 52 for operation in the clean mode, which will be described in more detail below. For ease of description, this predefined current level to initiate clean mode operation may also be referred to herein as the "clean current level".

Figure 10:
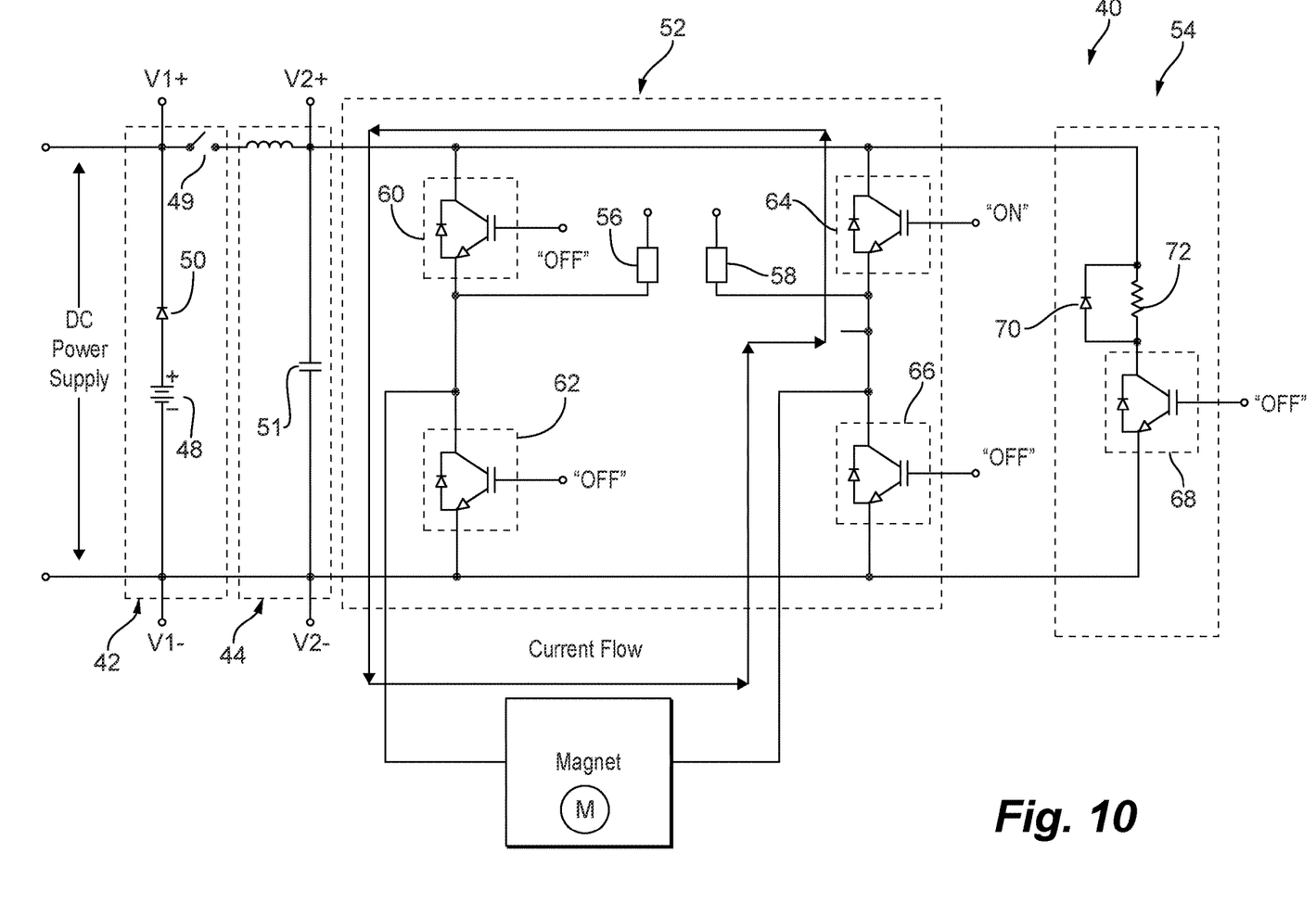
FIG. 10 is a schematic diagram of the exemplary embodiment of the drive unit of FIG. 6, illustrating the flow of current through the drive unit when the magnet control unit is in a regenerating mode of operation and a failure of the dump network is detected by the processor.

Referring to FIGS. 7 and 10, if after the processor 120 turns the dump driver 68 "on" the voltage V2 of the power storage unit 44 continues to rise, the processor 120 determines that the dump network 54 is not functioning properly. It is noted that the voltage V2 should remain below a predefined level (e.g., below about 325 VDC and about 350 VDC) at all times. This predefined level may also be referred to herein as the "dump failure voltage". In order to protect the components of the magnet controller 30, the processor 120 configures the bridge network 54 to operate in a safety mode. In the safety mode, the processor 120 turns the lift high driver 60 and the clean high driver 64 "on" and turns the clean low driver 62 and the lift low driver 66 "off" forming a low impedance path between the lift high driver 60, the clean high driver 64 and the magnet M. The processor 120 may also attempt to turn the dump driver 68 back "on". In this configuration of the bridge network 52, current from the magnet continuously flows through the clean high driver 64, through the lift high driver 60 and through the magnet M consuming the current through the low impedance path until the magnet current is dissipated.

A second safety mode can also be invoked if the magnet M is regenerating and the voltage in the power storage unit 44 reaches a second, higher predefined voltage level, for example 350 VDC. In this case, power is temporarily re-applied to the regenerating magnet M, by turning "on" the lift high driver 60 and the lift low driver 66. Such a situation might arise because of stray inductance in the supply leads, a filtering inductor in the DC supply, or stray inductance in a transformer that feeds a rectifier which is the magnet control's supply.

If the magnet control unit 10 includes a dribble mode of operation, the dribble operation may be included in the drop mode of operation. For example, if the dribble mode of operation is enabled and a drop command is received by the magnet controller 30, the bridge network 52 configuration for a hold operation would be maintained by the processor 120, such that the lift high driver 60 is "on," a hold PWM signal would be applied to the lift low driver 66, and the clean low driver 62 and the clean high driver 64 would be "off" However, in the dribble mode operation, the signal level of the PWM signal applied to the lift low driver 66 is slowly ramped down from the hold PWM signal level over a predetermined period of time until the duty cycle of the PWM signal is in a range of about 10% and about 20%. For example, if the lift load is scrap metal, the hold PWM signal applied to the lift low driver 66 would slowly ramp down over a period in the range of about 2 seconds and about 5 seconds. For ease of description, this slow duty cycle ramp down period of the PWM signal may also be referred to herein as the "dribble time." In the dribble mode of operation, as magnet M slowly discharges due to the reduced current applied to the magnet, portions of the lift load are released by the magnet over the dribble time. When the current flowing through the magnet M falls below the clean current level, the processor 120 then automatically configures the bridge network 52 for operation in the clean mode, which will be described below.

The clean mode of operation of the magnet controller 30 will be described with reference to FIG. 7. As noted above, when the current in the magnet M, which is measured by the current sensors 56 and 58, falls to the clean current level, the processor 120 automatically configures the magnet controller 30 for clean mode operation. The clean current level may range from about 2 amps to about 5 amps. Generally, in the clean mode of operation, the magnet current is reversed causing the magnetic field to change from an attractive force to a repellant force so that any residual lift load attached to the magnet after a drop mode or a dribble mode of operation would be repelled so that the magnet is cleaned. In other words, any residual lift load attached to the magnet M after completion of a drop mode or a dribble mode of operation would be repelled from the magnet M during the clean mode of operation. More specifically, when the processor 120 measures the clean current level at the current sensors 56 and 58, the processor turns the clean high driver 64 "on" and applies a PWM signal to the clean low driver 62 so that the clean low driver 62 rapidly ramps up to operate at 100% duty cycle effectively turning the clean low driver 62 "on." During this transition, current regenerates, or continues to flow through the clean high driver 64, through the magnet M and the clean low driver 62. The magnet current continues to flow through the clean high driver 64, through the magnet M and the clean low driver 62 path until the magnet energy is dissipated. When the magnet energy is dissipated, the clean low driver 62 and the clean high driver 64 become reverse biased and the PWM signal on the clean low driver 62 begins to pull current through the clean high driver 64 in the opposite direction through the magnet M. This reversed cleaning current changes the magnetic field to a repellant force to eject any remaining lift load from the magnet M.

When in the lift mode of operation, if the DC power supply to the control unit 10 is lost such that DC power supply voltage V1 and the voltage V2 across the power storage unit 44 are determined by the processor 120 to have dropped below a predefined voltage, the processor 120 switches the magnet controller 30 to a power outage mode of operation. This predefined voltage may also be referred to herein as the "low supply voltage" and may be, for example, in the range of about 180 VDC and about 200 VDC. When the processor 120 switches the magnet controller 30 to the power outage mode of operation, the processor 120 turns the lift high driver 60 "on," opens the power switch 49, and turns the lift low driver 66, the clean high driver 64 and the clean low driver 62 "off" With the voltage V2 across the power storage unit 44 below the low supply voltage, the body diode in the clean high driver 64 is reversed biased. As such, magnet current flows through the magnet M, through the body diode of the clean high driver 64, through the lift high driver 60 and back through the magnet M.

If the voltage V2 across the power storage unit 44 drops below the low supply voltage level, the processor 120 pulses the lift high driver 60 "off" for a sufficient period of time to charge the power storage unit 44. Pulsing the lift high driver 60 "off" redirects the magnet current through the power storage unit 44 and recharges the power storage unit. When the voltage V2 across the power storage unit 44 rises above the low voltage supply level, the processor turns the lift high driver 60 "on" allowing the magnet current to again circulate around the low impedance path, i.e., magnet current flows through the magnet M, through the body diode of the clean high driver 64, through the lift high driver 60 and back through the magnet. This outage mode of operation continues until either the residual magnet energy is depleted, the lift load is dropped from the magnet and the magnet control unit 10 shuts down, or until the DC supply voltage V1 returns to a level that is greater than the low supply voltage level. If the DC supply voltage V1 rises above the low voltage supply level, then the magnet controller 30 is returned to its normal lift configuration by closing the power switch 49, turning "on" the lift high driver 60 and turning "on" (a 100% duty cycle PWM signal) or "pulsing" (a PWM signal with less than a 100% duty cycle) the lift low driver 66 as described above.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A magnet controller for controlling an electromagnet, the magnet controller comprising:
   a processor; and
   a drive unit, the drive unit having a bridge network operatively connected to the processor and a dump network having at least a portion operatively connected to the processor, the bridge network being operatively connected to the electromagnet and having a plurality of drivers arranged in a bridge configuration, wherein the dump network is configured to limit voltage that can occur across the bridge network, and wherein if the dump network is determined by the processor not to be functioning the processor automatically configures the bridge network to a safety mode of operation where a pair of the plurality of drivers are effectively shorted together.

2. The magnet controller according to claim 1, wherein the processor is capable to configure the bridge network to the safety mode of operation by activating the pair of the drivers and deactivating another pair of the drivers forming a low impedance path between the pair and the electromagnet.

3. The magnet controller according to claim 1, wherein the processor is capable to configure the bridge network to a lifting mode of operation causing the electromagnet to lift a load by activating a first driver and applying a pulse-width modulated (PWM) signal at a 100% duty cycle to a second driver.

4. The magnet controller according to claim 3, wherein the processor is capable to configure the bridge network to a holding mode of operation causing the electromagnet to hold the load by lowering the duty cycle of the PWM signal applied to the second driver.

5. The magnet controller according to claim 3, wherein the processor is capable to configure the bridge network to a drop mode of operation causing the electromagnet to release the load by deactivating the first and second drivers and activating a third driver and a fourth driver.

6. A magnet control unit for controlling an electromagnet, the magnet control unit comprising:
   a housing;
   a processor unit within the housing; and
   a drive unit within the housing, the drive unit comprising:
     a power storage unit configured to supply DC power to the magnet control unit;
     a backup power supply adapted to supply a backup power to the magnet control unit when the DC power supplied by the power storage unit is lost; and
     a magnet drive engine having a bridge network operatively connected to the electromagnet and a dump network, the bridge network having one or more current sensors connected to the processor and a plurality of drivers arranged in a bridge configuration and each connected to the processor, the dump network having at least a portion operatively connected to the processor;
   wherein the bridge network is configured to control direction of current flow to the electromagnet, and the dump network is configured to maintain an output voltage generated by the power storage unit at a predefined level; and
   wherein if the dump network is determined by the processor not to be functioning the processor automatically configures the bridge network to a safety mode of operation where at least a pair of the plurality of drivers are effectively shorted together.

7. The magnet control unit according to claim 6, wherein the dump network is electrically connected in parallel to the bridge network and includes a dump driver, a discharge diode, and a discharge resistor, and wherein the dump driver is operatively controlled by the processor to limit voltage across the power storage unit and the bridge network.

8. The magnet control unit according to claim 7, wherein the processor is configured to determine the voltage across the power storage unit, and in response to the voltage rising to a predefined voltage level activate the dump driver so that current flows through the discharge resistor of the dump network.

9. The magnet control unit according to claim 6, wherein the backup power supply includes a battery bank, one or more isolation diodes and a power switch, and wherein when the DC power supplied by the power storage unit is lost the one or more isolation diodes switch from being reversed biased to being forward biased to allow current to flow from the battery bank to the magnet drive engine and processor.

10. The magnet control unit according to claim 6, wherein the one or more sensors are configured to measure a current flow through the electromagnet, and wherein the one or more sensors are connected to the processor via an analog to digital converter.

11. The magnet control unit according to claim 6, wherein the plurality of drivers includes a pair of drivers that can be selectively activated to energize or electrically charge the electromagnet for lifting and holding a load, and a pair of drivers that can be selectively activated to discharge the electromagnet for releasing the load from the electromagnet.

12. The magnet control unit according to claim 6, wherein the processor is directly or wirelessly connected to a user input device, and wherein the processor, in response to a lift command or a drop command received from the user input device, is configured to cause the electromagnet to lift or release a load.

13. The magnet control unit according to claim 12, wherein the processor, in response to the lift command received from the user input device, is configured to apply a lifting current and, after a predetermined period of time, automatically apply a holding current to the electromagnet.

14. The magnet control unit according to claim 6, wherein the processor is configured to apply a lifting current to the electromagnet by activating a first driver and applying a pulse-width modulated (PWM) signal at a 100% duty cycle to a second driver, and wherein the processor, after a predetermined period of time, automatically reduces a level of current applied to the electromagnet from the lifting current to a holding current by lowering the duty cycle of the PWM signal applied to the second driver.

15. The magnet control unit according to claim 14, wherein the processor is configured to discharge the electromagnet by deactivating the first and second drivers and activating a third driver and a fourth driver.

16. The magnet control unit according to claim 6, wherein the processor is adapted to configure the bridge network to a clean mode of operation where the current flow to the electromagnet is reversed causing the electromagnet to repel a residual attached to the electromagnet.

17. A magnet controller for controlling an electromagnet, the magnet controller comprising:
   a processor; and
   a drive unit, the drive unit having a bridge network operatively connected to the processor and a dump network having at least a portion operatively connected to the processor, the bridge network being operatively connected to the electromagnet and having a plurality of drivers arranged in a bridge configuration, the bridge network is configured to control direction of current flow to the electromagnet and the dump network is configured to limit voltage that can occur across the bridge network;
   wherein the processor is configured to apply a lifting current to the electromagnet by activating a first driver and applying a pulse-width modulated (PWM) signal at a 100% duty cycle to a second driver, and to apply a holding current by lowering the duty cycle of the PWM signal applied to the second driver; and
   wherein if the dump network is determined by the processor not to be functioning the processor automatically configures the bridge network to a safety mode of operation where a pair of the plurality of drivers are effectively shorted together.

18. The magnet controller according to claim 17, wherein the processor is configured to discharge the electromagnet by deactivating the first and second drivers and activating a third driver and a fourth driver.

* * * * *